United States Patent

Scheffel et al.

[15] 3,684,012

[45] Aug. 15, 1972

[54] METHOD AND COMPOSITION FOR TREATING HIGH-TEMPERATURE SUBTERRANEAN FORMATIONS

[72] Inventors: John W. Scheffel, 548 N. Mountain View, Fullerton, Calif. 92631; Paul W. Fischer, 11751 E. Beverly Blvd., Whittier, Calif. 90601; Ethan R. Schmidt, 231 So. Valencia, La Habra, Calif.

[22] Filed: June 12, 1970

[21] Appl. No.: 45,917

[52] U.S. Cl. ................166/283, 166/295, 175/65, 252/8.55 R, 252/8.5 C, 260/28.5 AV
[51] Int. Cl. ...C08f 21/04, C08f 45/52, E21b 33/138
[58] Field of Search......166/280, 282, 283, 307, 308, 166/294, 295; 252/8.55 C, 8.55 R, 8.5 C, 8.5 A, 8.5 P; 260/28.5 AV

[56] References Cited

UNITED STATES PATENTS

| | | | |
|---|---|---|---|
| 3,515,691 | 6/1970 | Arabian | 260/28.5 AV |
| 3,205,186 | 9/1965 | Zaayenga | 260/28.5 AV |
| 3,330,793 | 7/1967 | Podlipnik et al. | 260/28.5 AV |
| 3,400,092 | 9/1968 | Fox | 260/28.5 AV |
| 3,322,709 | 5/1967 | Hammer | 260/28.5 AV |
| 3,245,930 | 4/1966 | McDowell et al. | 260/28.5 AV |
| 3,302,719 | 2/1967 | Fischer | 166/280 |
| 3,316,965 | 5/1967 | Watanabe | 166/280 |
| 3,342,263 | 9/1967 | Fischer | 166/280 |
| 3,363,690 | 1/1968 | Fischer | 166/280 |
| 3,477,512 | 11/1969 | Siegele | 166/283 |

*Primary Examiner*—Stephen J. Novosad
*Attorney*—Milton W. Lee, Richard C. Hartman, Lannas S. Henderson, Dean Sandford and Robert E. Strauss

[57] ABSTRACT

A water-insoluble particulate composition have controlled slow oil-solubility at elevated temperatures is disclosed. The composition is comprised of solid particles of a homogeneous mixture of (1) about 4 to 30 weight percent of an ethylene-vinyl acetate copolymer containing about 15 to 30 weight percent vinyl acetate, (2) a paraffin wax having a melting point between about 130° F. and 175° F., and (3) about 10 to 25 weight percent of a long chain aliphatic hydrocarbon or oxidized hydrocarbon wax melting between about 195° F. and 250° F. and exhibiting an Izod strength of less than 0.9 foot-pounds. Also disclosed is a process employing this particulate composition in drilling wells into high-temperature subterranean formations, and in fracturing and treating such formations.

36 Claims, No Drawings

METHOD AND COMPOSITION FOR TREATING HIGH-TEMPERATURE SUBTERRANEAN FORMATIONS

This invention relates to well drilling and treating, and more particularly to a method and composition for temporarily reducing the permeability of high-temperature, permeable oil-bearing formations. The method and compositions of this invention have particular application in hydraulic fracturing, in well treating, and in completing oil and gas wells that penetrate relatively high-temperature subterranean formations.

Although high fluid permeability is a desirable characteristic of a hydrocarbon producing formation, many drilling, fracturing and well treating operations are adversely affected when a well penetrates such highly permeable formations. The effectiveness and efficiency of these processes are substantially improved by temporarily plugging the more permeable strata to reduce the loss of drilling, fracturing, or well treating fluids thereto. Accordingly, low fluid loss agents have been developed for use in these applications. Also, particular plugging agents are used as diverting agents in multiple fracturing operations, and to plug selected strata to obtain fluid shutoff.

In the aforesaid applications, it is essential that the temporary fluid loss control or plugging agent be readily removed from the hydrocarbon producing zones to prevent permanent loss of permeability and an attendant reduction in oil production rate. Removal may be effectively accomplished by utilizing an agent that is soluble in the formation hydrocarbons. However, many of the prior art materials are either insoluble under bottom hole conditions, or are so highly soluble that they are difficult to place in the formation and fail to maintain the required plug during the treating operation. It is therefore essential that the fluid loss or plugging agent possess the property of controlled solubility wherein a satisfactory solid plug will thereafter be removed by being slowly dissolved by the formation hydrocarbons.

It is also advantageous to utilize a material that is insoluble in water, thereby leaving any water producing strata permanently sealed. Thus, selective plugging is effected, the hydrocarbon producing strata being temporarily plugged and the water producing strata remaining permanently sealed. On removal of the temporary plugging agent from the hydrocarbon producing strata, oil and gas production capability is fully restored, while water production is permanently eliminated or substantially decreased.

Each of the aforesaid well treating processes commonly require a temporary plugging material capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shut-off obtained. Therefore, it is essential that the particles do not agglomerate or stick together in the treating fluid to form clumps of widely varing dimensions during the treating operation. While other properties of the particulate agent may influence particle agglomeration, agglomeration is largely controlled by the tackiness of the particle surface. Hence, it is necessary that the plugging particles or agents exhibit a low degree of tackiness on exposure to air at ambient temperatures and also remain non-tacky or nonsticky upon exposure to formation hydrocarbons and to the treating fluids. In addition, particles which are somewhat resilient possess superior plugging properties since they deform to effectively fill flow passages. Also, high mechanical and impact strength is desirable to avoid size reduction of individual particles by attrition.

Various slowly oil-soluble, water-insoluble particulate agents useful in well drilling and treating operations have been developed. In particular, U.S. Pat. No. 3,316,965 discloses the use of homogeneous solid particles of non-gaseous hydrocarbon and polymer; U.S. Pat. No. 3,342,263 discloses the use of discrete solid particles of a homogeneous solid mixture of a polymer and a halogenated aromatic hydrocarbon melting above about 120° F.; U.S. Pat. No. 3,363,690 discloses the use of particles of a homogeneous solid mixture of a polymer and an alcohol melting above about 120° F.; and U.S. Pat. No. 3,302,719 discloses solid particles comprised of a homogeneous mixture of polymer, wax and resin. While these compositions are satisfactory in many well drilling and treating applications, and their use has contributed greatly to increased oil-recovery, they have not been completely successful in the treatment of relatively high-temperature subterranean formations.

The bottomhole temperature of a well varies with the geographical location of the well and with its depth. Many producing wells, particularly in the United States and Canada, have bottomhole temperatures above 155° F., and often as high as 180° F., and above. In order that the treated wells can be returned to full production, the injected temporary plugging or diverting agents must be soluble in the reservoir oil at the reservoir temperature to the extent that substantially all of the plugging agent is removed within a reasonably short time, such as between about 1 and 6 days after returning the well to production. The solid compositions that are completely solubilized by the reservoir oil in less than 12 hours or greater than 6 days have been found to be undesirable for many of the well treating processes. Many of the compositions disclosed in the foregoing patents, while quite satisfactory for the treatment of formations having temperatures below about 155° F., are too soluble at higher temperatures to provide optimum treatment of the higher temperature formations, particularly those formations having temperatures between 155° and 180° F., and fail to provide an adequate plug for a sufficient period of time, or do not possess the requisite properties of strength and non-tackiness. Thus, there exists a need for a particulate solid composition that has the characteristic of controlled slow oil solubility at high formation temperatures, and particularly at temperatures between about 155° and 180° F., that is insoluble in water, and that exhibits other requisite properties of hardness, strength and non-tackiness.

Accordingly, it is an object of this invention to provide an improved well treating process for temporarily plugging high-temperature subterranean formations. Another object of the invention is to provide an improved well treating process for plugging or retarding fluid flow through high-temperature earth formations that does not permanently reduce the permeability of the formation to hydrocarbon fluids. Another object of the invention is to provide a process for fracturing high-temperature subterranean formations wherein a diverting agent is deposited in the fracture to retard the flow of fracturing fluid therein so as to effect multiple fractures in the formation. Another object of the invention is to provide an effective low fluid loss additive for addition to a fracturing fluid. A still further object is to provide a low fluid loss additive to be added to a fluid placed in a well bore penetrating a high-temperature formation which will act to temporarily reduce the formation permeability without effecting a permanent reduction of the hydrocarbon permeability of the formation. A still further object is to provide a fluid loss additive which is soluble upon prolonged contact with reservoir hydrocarbons at a temperature between about 155° and 180° F. and that remains non-tacky when incorporated into a treating fluid. Other objects and advantages of the invention will be apparent to those skilled in the art from the description thereof which follows.

The foregoing objects and their attendant advantages can be attained by treating the subterranean formation with a particulate material comprising discrete solid particles of a homogeneous mixture of (1) about 4 to 30 weight percent of an ethylene-vinyl acetate copolymer containing about 15 to 30 weight percent vinyl acetate, (2) a paraffin wax melting between about 130° F. and 175° F., and (3) about 10 to 25 weight percent of a solubility retarding agent comprising long-chain aliphatic hydrocarbon or oxidized hydrocarbon waxes having a melting point between about 195° F. and 250° F. and exhibiting an Izod strength of less than 0.9 foot-pounds.

The particulate compositions of this invention are insoluble in water and slowly soluble in oil, and are particularly useful as fluid loss control agents and as diverting or plugging agents in treating and hydraulically fracturing subterranean earth formations having a temperature between about 155° F. and 180° F. penetrated by a well, and in the drilling of wells into such formations. The particles can be employed in formations having higher temperatures if delayed solubility is not critical to the process or if a sufficient quantity of cool treating fluid is introduced into the well during the treating process to cool the formation adjacent to the well to a temperature within the effective temperature range of the particles for controlled oil solubility, thereby allowing use of the particles in formations having temperatures that are normally above about 180° F., and even above about 190° F.

The oil solubility of the particulate composition can be determined by intimately contacting the particles with a test solvent such as crude petroleum recovered from the oil-bearing formation to be treated, or a similar liquid solvent, maintained at the temperature of the formation. The particulate compositions of this invention are slowly soluble in oil at a temperature between about 155° F. and 170° F. so that not more than 50 volume percent of the particles are dissolved by the oil during the first 6 hours of exposure to the oil, and at least 50 volume percent of the particles are dissolved during the last 18 hours of a 24 hour exposure period. Thus, the solid particulate composition can be employed in treating a wide range of high-temperature formations as the solid particles are substantially insoluble on contact with oil at a temperature below about 170° F. for a short period of time, such as 6 hours, and is completely dissolved or dispersed in the oil upon prolonged contact therewith at temperatures above about 155° F. so that substantially no solid residue remains to plug the oil-bearing strata of the formation.

The compositions of this invention comprise discrete solid particles of a homogeneous mixture of (1) about 4 to 30 weight percent of an ethylene-vinyl acetate copolymer, (2) paraffin wax, and (3) about 10 to 25 weight percent of a solubility retarding agent comprising long chain aliphatic hydrocarbon or oxidized hydrocarbon waxes.

The ethylene-vinyl acetate copolymer is a copolymer of ethylene and vinyl acetate containing from 15 to 30 weight percent vinyl acetate, and preferably from about 17 to 26 weight percent vinyl acetate. It has been found that copolymers containing more than about 30 weight percent vinyl acetate are undesirable as they tend to separate from the molten blend, and that particulate compositions prepared from copolymers containing less than about 15 weight percent vinyl acetate are not sufficiently soluble in oil. The ethylene vinyl acetate copolymers which can be employed herein generally exhibit a melt index between about 1 and 600 grams per 10 minutes and good results can be obtained with copolymers having a melt index between about 1 and 50 grams per 10 minutes, and more preferably between about 1 and 10 grams per 10 minutes. Exemplary ethylene-vinyl acetate copolymers useful in the practice of this invention are listed in Table I.

TABLE I

| Trademark | Supplier | Melt Index gms./10 min. | Vinyl Acetate Content, Wt. % |
|---|---|---|---|
| ELVAX 210 | E.I. duPont deNemours Co. | 335–465 | 27–29 |
| ELVAX 260 | do | 5–7 | 27–29 |
| ELVAX 310 | do | 335–465 | 24–26 |
| ELVAX 350 | do | 16–22 | 24–26 |
| ELVAX 360 | do | 1.6–2.4 | 24–26 |
| ELVAX 410 | do | 430–580 | 17–19 |
| ELVAX 420 | do | 125–175 | 17–19 |
| ELVAX 460 | do | 2.1–2.9 | 17–19 |

A particularly preferred copolymer for use in the compositions of this invention is an ethylene-vinyl acetate copolymer that contains 17 to 19 weight percent vinyl acetate and exhibits a melt index of about 2 to 3 grams per 10 minutes. A commercial ethylene vinyl acetate copolymer exemplary of this preferred copolymer is marketed by E.I. duPont de Nemours Company under the trademark ELVAX 460.

Another preferred copolymer is an ethylene-vinyl acetate copolymer that contains about 24 to 26 weight percent vinyl acetate and exhibits a melt index of about 1 to 3 grams per 10 minutes. A commercial ethylene-vinyl acetate copolymer exemplary of this copolymer is marketed by E. I. duPont de Nemours Company under the trademark ELVAX 360.

The term "melt index" as employed herein is the flow rate reported as the rate of extrusion in grams per 10 minutes as determined by ASTM test method D1238–65T entitled "Measuring Flow Rates of Thermoplastics by Extrusion Plastometer" and performed under Standard Test Condition E, ASTM Standards, American Society for Testing Materials, Part 27, June 1969, pages 455–466, which procedure is herein incorporated by reference.

The paraffin wax employed in the particulate compositions of this invention is a crystalline paraffin wax having a melting point between about 130° F. and 175° F., and preferably is a fully refined crystalline paraffin wax having a melting point between about 150° F. and 170° F., and more preferably between about 160° F. and 170° F. The paraffin wax is present in the composition in a major proportion, such as from about 45 to 86 weight percent of the composition.

The oil solubility of the solid particulate compositions of this invention at the elevated formation temperature is controlled by the addition of a suitable solubility retarding agent which slows the rate of dissolution of the solid particles in oil without adversely affecting the other properties of the solid composition. Agents which can be incorporated into the homogeneous composition to retard the oil solubility of the particles include long chain aliphatic hydrocarbon and oxidized hydrocarbon waxes which melt between about 195° F. and 250° F. and exhibit Izod strengths of less than 0.9 foot-pounds. A homogeneous solid particulate composition having the desired slow oil solubility can be prepared by the addition of about 10 to 25 weight percent of a long chain aliphatic hydrocarbon wax having aforementioned properties.

Long chain aliphatic hydrocarbon and oxidized hydrocarbon waxes that can be employed as solubility retarding agents include certain high molecular weight natural and synthetic waxes such as carnauba wax, various Fischer-Tropsch waxes, and polyethylenes melting between about 195° F. and 250° F. and exhibiting Izod strengths of less than 0.9 foot-pounds. These waxes are characteristically straight or branched chain aliphatic hydrocarbons and oxygenated aliphatic hydrocarbon compounds such as aliphatic carboxylic acids and esters having molecular weights higher than the paraffin waxes, and particularly having molecular weights of about 500 to 2,500. Aromatic and cycloaliphatic hydrocarbon waxes are generally not satisfactory oil solubility retarding agents as they do not sufficiently reduce the oil solubility of the resulting solid particulate compositions. A preferred class of oil solubility retarding agents are long chain aliphatic hydrocarbon and oxidized hydrocarbon waxes having melting points between about 200° F. and 230° F. and exhibiting Izod strengths below about 0.5 foot-pounds, and more preferably below about 0.10 foot-pounds. Exemplary oil solubility retarding agents are listed in Table II.

TABLE II

| Trademark | Supplier | Type | Chemical Class | Average Melting Point, °F. | Izod strength, foot-pds |
|---|---|---|---|---|---|
| Duroxon E321 | Dura Commodities Corp. | Fischer-Tropsch Wax | Oxidized hydrocarbon | 209 | 0.07 |
| Duron 195/162 | do | do | do | 220 | 0.13 |
| Dura FT-95 | do | do | do | 214 | 0.08 |
| Dura FT-200 | do | do | do | 214 | 0.08 |
| Ruhrwax A-116 | do | do | do | 243 | 0.09 |
| A-C poly-ethylene | Allied Chemical | Polyethylene | Hydrocarbon | 225 | 0.51 |
| Altasene 2020 | Atlas Refinery, Inc. | Fischer-Tropsch Wax | Oxidized hydrocarbon | 208 | 0.30 |
| Altasene 2525 | do | do | do | 207 | 0.20 |
| Altasene 3030 | do | do | do | 196 | 0.30 |
| Para-flint | So. African Coal Oil Gas Col. | do | Hydrocarbon | 214 | 0.08 |
| Cardis Polymer No.10 | Western Petro-Chemical Corp. | do | Hydrocarbon | 214 | 0.09 |
| — | International Wax Refining | Carnauba Wax | Oxidized Hydrocarbon | 214 | 0.08 |

A particularly preferred oil solubility retarding agent is a Fischer-Tropsch hydrocarbon wax having a melting point between about 210° F. and 220° F. and exhibiting an Izod strength of less than 0.1 foot-pounds, exemplary of which is a Fischer-Tropsch wax marketed by the South African Coal and Gas Company under the trademark Paraflint.

The term "Izod strength" as used herein is defined as the impact resistance as determined by ASTM test method D256–47T entitled "Impact Resistance of Plastics and Electrical Insulating Materials", ASTM Standards, American Society for Testing Materials, Part 6, 1969, pages 1,025–1,030, which procedure is herein incorporated by reference.

The compositions of this invention are readily prepared by melting the individual components and then admixing the molten liquids in the proper proportions. Alternatively, the solid ingredients can be combined in the proper proportion and then melted to obtain a homogeneous liquid mixture. In either case, the proportion of each component is selected to impart the desired properties to the final solidified product.

Compositions suitable for treating high-temperature subterranean formations comprise solid particles of a homogeneous mixture of (1) about 4 to 30 weight percent of the aforementioned ethylene-vinyl acetate copolymers, and preferably between about 8 and 13 weight percent copolymer, (2) between about 10 and 25 weight percent of the above disclosed oil solubility retarding agent, and preferably between about 17 and 23 weight percent of this agent, with the balance of the composition being paraffin wax melting between about 130° F. and 175° F. It is further preferred that the total amount of ethylene-vinyl acetate copolymer and oil solubility retarding agent be maintained below about 45 weight percent, and more preferably between about 20 and 40 weight percent of the particulate composition, i.e., it is preferred that the composition contain at least 55 weight percent paraffin wax, and more preferably at least 60 weight percent paraffin wax, and even more preferably from about 60 to 80 weight percent paraffin wax. Also, the compositions can contain small amounts of additives, such as oxidation inhibitors, and the like.

A particularly preferred particulate composition comprises solid particles of a homogeneous mixture of (1) about 8 to 13 weight percent of an ethylene-vinyl acetate copolymer containing about 17 to 19 weight percent vinyl acetate and exhibiting a melt index of about 2 to 3 grams per 10 minutes, (2) about 64 to 75 weight percent of a fully refined paraffin wax melting between about 160° F. and 170° F., and (3) about 17 to 23 weight percent of a Fischer-Tropsch hydrocarbon wax having a melting point between about 210° F. and 220° F. and an Izod strength of less than 0.1 foot-pounds.

Another preferred composition comprises solid particles of a homogeneous mixture of (1) about 8 to 13 weight percent of an ethylene-vinyl acetate copolymer that contains 24 to 26 weight percent vinyl acetate and exhibits a melt index of about 1 to 3 grams per 10 minutes, (2) about 64 to 75 weight percent of a fully refined crystalline paraffin wax having a melting point between about 160° F. and 170° F., and (3) about 17 to 23 weight percent of a Fischer-Tropsch hydrocarbon wax having a melting point between about 210° F. and 220° F. and an Izod strength of less than 0.1 foot-pounds.

The solid particles used in the practice of this invention vary widely in size and shape. Typically, these particles can be speroids, cubes, granules, buttons, flat disks, or mixtures thereof, having means diameters in the range of from about one-half inch to about 1 micron and less. More particularly, the particles can be cubes, buttons, or disks having mean diameters of from about one-eighth inch to about one-half inch, speroids or granules in the size range of from about 4 to 200 mesh U.S. Standard screen, or particles having mean diameters of from about 1 to 50 microns.

The compositions of this invention are useful in treating high-temperature subterranean formations having temperatures above about 155° F., and is especially useful in treating formations having temperatures between about 155° F. and 180° F. and in some instances in the treating of formations having temperatures greater than 180° F. In its broadest application, the process comprises contacting a subterranean formation penetrated by well with a suspension of solid particles of the aforesaid composition in a suitable carrier liquid injected through the well. This treatment can comprise a single temporary and selective plugging step, or it can be an integral part of a comprehensive fracturing, well drilling, acidizing, or solvent treating process. Also, the particulate composition of this invention can be effectively used as a low fluid loss agent in a drilling fluid employed in well drilling and particularly as a low fluid loss agent in completion fluids employed in the drilling of oil and gas wells, and in workover fluids employed in recompleting oil and gas wells. In the drilling and workover applications, the drilling fluid is circulated from the surface to the drilling zone in a high-temperature formation during the drilling operation, and at least a portion of the fluid is returned to the surface. The particulate compositions of this invention can be incorporated in the fracturing fluids employed in hydraulically fracturing an earth formation surrounding a well, and the composition can be employed in chemical treating, acidizing, and other well treating operations wherein it is desired to control fluid loss to permeable underground structures.

The particulate compositions of this invention can be more readily dispersed into a carrier liquid by the addition of a small amount of a surface active agent to the carrier liquid. Also, small amounts of a surface active agent or a mixture of surface active agents can be added to the dispersion to enhance the fluid loss properties of the particles. Furthermore, other types of fluid retarding agents such as viscosity increasing agents, solid inorganic particles, and the like, can be incorporated into the suspension of plugging particles, and the use of such agents in combination with the plugging particles is included within the scope of this invention.

The invention is further illustrated by the following examples which are illustrative of specific modes of practicing the invention and are not intended as limiting the scope of the invention as defined by the appended claims.

EXAMPLES 1–18

The effect of various solubility retarding agents on the oil solubility of solid wax-polymer particulate compositions is illustrated by this series of examples. In each example a solid well treating composition is prepared by admixing in their molten state 10 weight percent of ethylene-vinyl acetate copolymer marketed by the E.I. duPont de Nemours Company under the trademark ELVAX 460, 70 weight percent of 165° F. melting point paraffin wax marketed by the Union Oil Company of California under the trademark Aristowax 165, and 20 weight percent of various oil solubility retarding agents. Droplets of the molten compositions are solidified to form homogeneous solid particles.

The oil solubilities of the solid compositions are determined by placing four approximately 3/16-inch diameter particles of the composition to be tested in each of four 6-dram vials filled with a solvent comprised of 50 volume percent kerosene and 50 volume percent 90 neutral oil (a paraffinic lubricating oil having a viscosity of about 90 SUS at 100° F.). One of the vials is placed in each of four ovens maintained at temperatures of 155° F., 160° F., 165° F., and 170° F., respectively, and rotated at approximately 16 rpm for a 24 hour contacting period. After 6 hours, the vials are removed from the ovens and their contents separately poured over 100 mesh U.S. Standard screens and the screens visually examined to determine the amount of solid particles remaining undissolved. The solvent and solid particles are replaced in the vials and the vials are returned to the same ovens and rotated therein for the remainder of the 24 hour contacting period. At the end of the contacting period, the contents of the vials are again separately poured over 100 mesh U.S. Standard screens and the amount of undissolved particles determined.

The results of these tests are reported in Table III. The solid compositions which are less than 50 volume percent dissolved in the solvent after six hours and more than 50 volume percent dissolved after 24 hours, and which exhibit a solubility difference of at least 50 volume percent upon contacting the solvent during the time span between 6 and 24 hours, are considered useful for the purposes of this invention and are designated "satisfactory" than 50 volume percent dissolved are designated "excessive solubility" and those compositions that are less than 50 volume percent dissolved after 6 hours and exhibit a solubility difference of less than 50 volume percent upon contacting the solvent during the last 18 hours of the contacting period are designated "insoluble".

TABLE III

Effect of Various Retarding Agents on the Solubility of Wax-Polymer Compositions

| Ex. | Trademark | Supplier | Type | Average melting point, °F. | Izod strength, Foot-Pounds | Particle solubility |
|---|---|---|---|---|---|---|
| 1 | Duroxon E-321 | Dura Commodities Corp. | Fischer-Tropsch Wax | 209 | 0.07 | Satisfactory |
| 2 | Duron 195/162 | do | do | 220 | 0.13 | Satisfactory |
| 3 | Dura FT-95 | do | do | 214 | 0.08 | Satisfactory |
| 4 | Dura FT-200 | do | do | 214 | 0.08 | Satisfactory |
| 5 | Ruhrwax A-116 | do | do | 243 | 0.09 | Satisfactory |
| 6 | A-C Polyethylene-615 | Allied Chemical | Polyethylene | 228 | 2.0+ | Insoluble |
| 7 | A-C Polyethylene 7 | do | do | 225 | 0.51 | Satisfactory |
| 8 | A-C Polyethylene 6 | do | do | 222 | 0.91 | Insoluble |
| 9 | Altasene 2020 | Atlas Refinery, Inc. | Fischer-Tropsch Wax | 208 | 0.30 | Satisfactory |
| 10 | Altasene 2525 | do | do | 207 | 0.20 | Satisfactory |
| 11 | Altasene 3030 | do | do | 196 | 0.30 | Satisfactory |
| 12 | Paraflint | So. African coal, oil Gas Co. | do | 214 | 0.08 | Satisfactory |
| 13 | Paricin 285 | Baker Castor Oil Co. | Amide derivative | 280 | 0.10 | Insoluble |
| 14 | Cardis polymer 010 | Western Petrochemical Corp. | Fischer-Tropsch Wax | 214 | 0.9 | satisfactory |
| 15 | Petrolite PE-100 | Petrolite Corp. | do | 195 | 0.45 | excessive solubility |
| 16 | Petrolite C-200 | do | do | 190 | 0.08 | excessive solubility |
| 17 | Santowax | Monsanto Chemical Co. | do | 293 | 0.09 | excessive solubility |
| 18 | OMP — | International Wax Refining Corp. | Carnauba Wax | 214 | 0.08 | satisfactory |

It is apparent from the foregoing that natural, Fischer-Tropsch and polyethylene waxes exhibiting melting points in the range of about 190° F. to 250° F. and Izod strengths of less than 0.9 foot-pounds are satisfactory oil solubility retarding agents for particulate solid wax-polymer compositions.

EXAMPLES 19-32

The effect of the concentration of oil solubility retarding agent and the type and concentration of ethylene-vinyl acetate copolymer on the oil solubility of the particulate compositions of this invention is demonstrated by these examples. A series of solid particulate compositions comprised of various proportions of 165° F. melting point paraffin wax marketed by the Union Oil Company of California under the trademark Aristowax 165, various ethylenevinyl acetate copolymers marketed by E.I. duPont de Nemours Company under the trademark ELVAX, and a 214° F. melting point Fischer-Tropsch wax marketed by the South African Coal Oil and Gas Company under the trademark Paraflint are prepared and tested for oil solubility in substantially the same manner as described in Examples 1-18. The particular compositions and the results of the oil solubility tests are reported in Table IV.

TABLE IV

Solid Particulate Compositions and Their Solubilities

| Ex. | Paraffin Wax wt. % | Oil solubility retarding Agent Wt. % | Ethylene-Vinyl Acetate Copolymer | | | Particle Solubility |
|---|---|---|---|---|---|---|
| | | | Wt. % | Vinyl Acetate (1) Wt. % | Melt Index (2) gm/10 minutes | |
| 19 | 90 | 0 | 10 | 17–19 | 2.1–2.9 | excessive solubility |
| 20 | 85 | 5 | 10 | 17–19 | 2.1–2.9 | excessive solubility |
| 21 | 80 | 10 | 10 | 17–19 | 2.1–2.9 | satisfactory |
| 22 | 70 | 20 | 10 | 17–19 | 2.1–2.9 | satisfactory |
| 23 | 70 | 25 | 5 | 17–19 | 2.1–2.9 | satisfactory |
| 24 | 70 | 30 | 0 | 17–19 | 2.1–2.9 | insoluble |
| 25 | 70 | 0 | 30 | 17–19 | 2.1–2.9 | excessive solubility |
| 26 | 60 | 10 | 30 | 17–19 | 2.1–2.9 | satisfactory |
| 27 | 70 | 20 | 10 | 17–19 | 125–175 | satisfactory |
| 28 | 70 | 20 | 10 | 17–19 | 430–580 | satisfactory |
| 29 | 70 | 20 | 10 | 24–26 | 1.6–2.4 | satisfactory |
| 30 | 70 | 20 | 10 | 24–26 | 16–22 | satisfactory |
| 31 | 70 | 20 | 10 | 27–29 | 5–7 | satisfactory |
| 32 | 70 | 20 | 10 | 27–29 | 335–465 | satisfactory |

(1) Weight percent of vinyl acetate in Copolymer.
(2) Melt index of copolymer as determined by ASTM D 1238–65T These examples illustrate that the compositions containing about 5 to 30 weight percent of ethylene-vinyl acetate copolymer, and about 10 to 25 weight percent of oil solubility retarding agent exhibit satisfactory oil solubilities.

EXAMPLE 33

A particulate solid well treating composition is prepared by admixing in their molten states (1) a paraffin wax that has a melting point of about 160° F. to 170° F., (2) about 12 weight percent of a molten ethylene-vinyl acetate copolymer containing about 17 to 19 weight percent vinyl acetate and exhibiting a melt index of about 2.1 to 2.9 grams per 10 minutes, (3) about 20 weight percent of a Fischer-Tropsch hydrocarbon wax melting at approximately 214° F. and exhibiting an Izod strength of about 0.08 foot-pounds, and (4) about 0.1 weight percent of 2,6-ditertiary butylpara-cresol, an oxidation inhibitor.

The molten composition is formed into discrete solid particles of the following size ranges:

1. Flat buttons having a thickness of approximately one-sixteenth inch and a diameter of about one-fourth inch to three-eighths inch;
2. Particles having sizes in the range of about 8 to 100 mesh U.S. Standard screen; and
3. Particles having sizes in the range of about 1 micron to 100 mesh U.S. Standard screen.

Approximately 50 percent of the particles in the 8 to 100 mesh size range have sizes in the range of 8 to 20 mesh U.S. Standard screen and about 50 percent have sizes in the range of 20 to 100 mesh.

EXAMPLE 34

This example illustrates the use of the method and composition of this invention in treating a high-temperature, subterranean oil-containing reservoir to stimulate the recovery of oil therefrom. The well is completed in a relatively shallow reservoir having a temperature of 160° to 165° F., with a total productive interval of about 10 feet perforated with two holes per foot at the depths of 3,066 to 3,072 feet and 3,082 to 3,086 feet.

The stimulation treatment is performed by injecting 3,000 gallons of 15 percent hydrochloric acid into the well, the introducing 12 pounds of particulate diverting agent, and then injecting another 3,000 gallons of acid. The diverting agent comprises flat buttons approximately one-fourth inch to three-eighths inch in diameter of the slowly oil-soluble, water-insoluble homogeneous solid composition described in Example 33. The initial slug of acid is injected into the well under vacuum. However, the second slug of acid injected after treatment with the diverting agent particles is injected at a surface pressure of 1,100 psig.

Upon completion of the acid injection, the well is flushed with leas crude and then with water, and the well returned to production. The production rate of oil is observed and found to be substantially higher than the rate prior to the stimulation treatment, which indicates that the stimulation treatment is successful and that the diverting agent particles are substantially removed from the oil-producing zones.

EXAMPLE 35

This example illustrates the use of the method and composition of this invention in fracturing a high-temperature, subterranean oil-producing formation. A production well is completed in a relatively shallow reservoir having a temperature of 160° to 165° F., with a total productive interval of 15 feet perforated with two holes per foot at the depths of 2,903 to 2,908 feet and 2,918 to 2,928 feet.

Fracturing is accomplished by injecting 10,000 pounds of 20 to 40 mesh sand in 10,000 gallons gelled brine into the well at a volume flow rate and pressure sufficient to fracture the formation. After approximately one-half of the fracturing fluid is injected, 10 pounds of diverting agent particles are slugged into the well and the fracturing fluid injection continued. The diverting agent comprises flat buttons approximately one-fourth inch to three-eighths inch in diameter of the slowly oil-soluble, water-insoluble homogeneous solid composition described in Example 33. The initial portion of the fracturing fluid is injected at a surface pressure of 950 psig. However, the injection pressure is increased to 1,500 psig after treatment with the diverting agent.

Upon completion of the fracturing operation, the well is flushed with lease crude and returned to production. The production rate of oil is observed and found to be substantially higher than the rate prior to fracturing, which indicates that the fracturing operation is successful and that the diverting agent particles are substantially removed from the oil-producing zones.

EXAMPLE 36

This example illustrates the use of the method and composition of this invention in drilling a well into a high-temperature formation having a temperature of 160° to 165° F. This well had previously been drilled to a depth of 3,108 feet and the plugged to a depth of 2,924 feet with pea gravel and cement. For a number of years the well was produced from a productive interval from 2,911 to 2,922 feet. However, it is now desired to open lower zones to production.

The plug is drilled out using a 3 ¾-inch-diameter bit on a conventional tubing string. Brine is used as a drilling fluid, and is circulated from the surface to the drilling zone and returned to the surface. The well is drilled from 2,924 feet to 3,005 without incident, but circulation is lost to the formation at 3,005 feet. Approximately 750 pounds of diverting agent particles are added to a gelled brine and the drilling resumed using this material as the drilling fluid. The diverting agent comprises particles of the slowly oil-soluble, water-insoluble homogeneous solid composition described in Example 33, the particles having sizes in the range of 8 to 100 mesh U.S. Standard screen, with approximately 50 percent of the particles having sizes in the range of 8 to 20 mesh and 50 percent having sizes in the range of 20 to 100 mesh. After addition of the diverting agent, good fluid circulation is observed. Drilling is continued to a depth of 3,108 feet without further difficulty.

The gelled brine is displaced from the well with ungelled brine, and again the formation did not take fluid. Then, 14 barrels of lease crude is placed in the well and allowed to stand overnight. After the oil soak, it is observed that the formation is open and readily capable of taking fluid.

While particular embodiment of the invention have been described, it will be understood, of course, that the invention is not limited thereto since many obvious modifications can be made, and it is intended to include within this invention any such modifications as will fall within the scope of the claims.

The invention having thus been described, we claim:

1. A method of treating a high-temperature subterranean formation penetrated by a well bore comprising injecting through said well bore and into contact with said formation a liquid having suspended therein discrete slowly oil-soluble, water-insoluble solid particles comprised of a homogeneous mixture of (1) about 4 to 30 weight percent of an ethylene-vinyl acetate copolymer containing about 15 to 30 weight percent vinyl acetate, (2) a paraffin wax having a melting point between about 130° F. and 175° F., and (3) about 10 to 25 weight percent of an oil solubility retarding agent comprising long chain aliphatic hydrocarbon and oxidized hydrocarbon waxes having melting points between about 195° F. and 250° F. and Izod strengths of less than 0.9 foot-pounds.

2. The method defined in claim 1 wherein said particles contain at least 55 weight percent of said paraffin wax.

3. The method defined in claim 1 wherein said ethylene-vinyl acetate copolymer exhibits a melt index of about 1 to 600 grams per 10 minutes.

4. The method defined in claim 1 wherein said ethylene-vinyl acetate copolymer is selected from Table I.

5. The method defined in claim 1 wherein said oil solubility retarding agent is selected from Table II.

6. The method defined in claim 1 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

7. The method defined in claim 1 wherein the temperature of said formation is between about 155° F. and 180° F.

8. The method defined in claim 1 wherein said oil solubility retarding agent is selected from the group consisting of Fischer-Tropsch waxes, polyethylenes and natural waxes.

9. The method defined in claim 1 wherein said particles are a homogeneous mixture of (1) about 8 to 13 weight percent of an ethylene-vinyl acetate copolymer containing about 17 to 19 weight percent vinyl acetate and exhibiting a melt index of about 2 to 3 grams per 10 minutes, (2) at least about 60 weight percent paraffin wax having a melting point between about 160° F. and 170° F. and (3) about 17 to 23 weight percent of a Fischer-Tropsch wax having a melting point between about 210° F. and 220° F. and an Izod strength of less than 0.1 foot-pounds.

10. The method of completing a well drilled into a permeable, high-temperature subterranean formation, which comprises circulating a completion fluid from the surface to a drilling zone in said formation during the drilling operation and returning to the surface at least a portion of said fluid said completion fluid comprising a liquid having suspended therein discrete slowly oil-soluble, water-insoluble solid particles comprised of a homogeneous mixture of (1) about 4 to 30 weight percent of an ethylene-vinyl acetate copolymer that contains about 15 to 30 weight percent vinyl acetate, (2) a paraffin wax having a melting point between about 130° F. and 175° F., and (3) about 10 to 25 weight percent of an oil solubility retarding agent comprising long chain aliphatic hydrocarbon and oxidized hydrocarbon waxes having melting points between about 195° F. and 250° F. and Izod strengths of less than 0.9 foot-pounds.

11. The method defined in claim 10 wherein said particles contain at least 55 weight percent of said paraffin wax.

12. The method defined in claim 10 wherein said ethylene-vinyl acetate copolymer exhibits a melt index of about 1 to 600 grams per 10 minutes.

13. The method defined in claim 10 wherein said ethylene-vinyl acetate copolymer is selected from Table I.

14. The method defined in claim 10 wherein said oil solubility retarding agent is selected from Table II.

15. The method defined in claim 10 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

16. The method defined in claim 10 wherein the temperature of said formation is between about 155° F. and 180° F.

17. The method defined in claim 10 wherein said oil solubility retarding agent is selected from the group consisting of Fischer-Tropsch waxes, polyethylenes and natural waxes.

18. The method defined in claim 10 wherein said particles are a homogeneous mixture of (1) about 8 to 13 weight percent of an ethylene-vinyl acetate copolymer containing about 17 to 19 weight percent vinyl acetate and exhibiting a melt index of about 2 to 3 grams per 10 minutes, (2) at least about 60 weight percent paraffin wax having a melting point between about 160° F. and 170° F., and (3) about 17 to 23 weight percent of a Fischer-Tropsch wax having a melting point between about 210° F. and 220° F. and an Izod strength of less than 0.1 foot pounds.

19. A method of fracturing a permeable, high-temperature subterranean formation penetrated by a well, which comprises injecting a fracturing fluid into said well and into contact with said formation at a pressure and volumetric flow rate sufficient to fracture said formation, said fracturing fluid comprising a liquid having suspended therein discrete oil-soluble, water-insoluble solid particles of a homogeneous mixture of (1) about 4 to 30 weight percent of an ethylene-vinyl acetate copolymer containing about 15 to 30 weight percent vinyl acetate, (2) a paraffin wax having a melting point between about 130° F. and 175° F., and (3) about 10 to 25 weight percent of an oil solubility retarding agent comprising long chain aliphatic hydrocarbon and oxidized hydrocarbon waxes having melting points between about 195° F. and 250° F. and Izod strengths of less than 0.9 foot-pounds.

20. The method defined in claim 19 wherein said particles contain at least about 55 weight percent of said paraffin wax.

21. The method defined in claim 19 wherein said ethylene-vinyl acetate copolymer exhibits a melt index of about 1 to 600 grams per 10 minutes.

22. The method defined in claim 19 wherein said ethylene-vinyl acetate copolymer is selected from Table I.

23. The method defined in claim 19 wherein said oil solubility retarding agent is selected from Table II.

24. The method defined in claim 19 wherein said ethylene-vinyl acetate copolymer contains about 17 to 19 weight percent vinyl acetate and exhibits a melt index of about 2 to 3 grams per 10 minutes, and wherein said paraffin wax has a melting point between about 160° F. and 170° F.

25. The method defined in claim 19 wherein the temperature of said formation is between about 155° F. and 180° F.

26. The method defined in claim 19 wherein said oil solubility retarding agent is selected from the groups consisting of Fischer-Tropsch waxes, polyethylenes and natural waxes.

27. The method defined in claim 19 wherein said particles are a homogeneous mixture of (1) about 8 to 13 weight percent of an ethylene-vinyl acetate copolymer containing about 17 to 19 weight percent vinyl acetate and exhibiting a melt index of about 2 to 3 grams per 10 minutes, (2) at least about 60 weight percent paraffin wax having a melting point between about 160° F. and 170° F., and (3) about 17 to 23 weight percent of a Fischer-Tropsch wax having a melting point between about 210° F. and 220° F. and an Izod strength of less than 0.1 foot-pounds.

28. A well treating composition comprising discrete solid particles of a homogeneous mixture of (1) about 4 to 30 weight percent of an ethylene-vinyl acetate copolymer containing about 15 to 30 weight percent vinyl acetate, (2) a paraffin wax having a melting point between about 130° F. and 175° F., and (3) about 10 to 25 weight percent of an oil solubility retarding agent comprising Fischer-Tropsch hydrocarbon and oxidized hydrocarbon waxes having melting points between about 195° F. and 250° F. and Izod strengths of less than 0.9 foot-pounds.

29. The composition defined in claim 28 containing at least 55 weight percent of said paraffin wax.

30. The composition defined in claim 28 wherein said ethylene-vinyl acetate copolymer exhibits a melt index of about 1 to 600 grams per 10 minutes.

31. A well treating composition comprising discrete solid particles of a homogeneous mixture of (1) about 4 to 30 weight percent of an ethylene-vinyl acetate copolymer containing about 15 to 30 weight percent vinyl acetate selected from Table I, (2) a paraffin wax having a melting point between about 130° F. and 175° F., and (3) about 10 to 25 weight percent of an oil solubility retarding agent comprising long chain aliphatic hydrocarbon and oxidized hydrocarbon waxes having melting points between about 195° F. and 250° F. and Izod strengths of less than 0.9 foot-pounds.

32. The composition defined in claim 31 wherein said oil solubility retarding agent is selected from Table II.

33. The method defined in claim 31 wherein said oil solubility retarding agent is selected from the group consisting of Fischer-Tropsch waxes, polyethylenes and natural waxes.

34. A well treating composition comprising discrete solid particles of a homogeneous mixture of (1) about 8 to 12 weight percent of an ethylene-vinyl acetate copolymer containing about 17 to 19 weight percent vinyl acetate and exhibiting a melt index of about 2 to 3 grams per 10 minutes, (2) at least about 60 weight percent paraffin wax having a melting point between about 160° F. and 170° F., and (3) about 17 to 23 weight percent of an oil solubility retarding agent comprising a Fischer-Tropsch wax having a melting point between about 210° F. and 220° F. and an Izod strength of less than 0.1 foot-pounds.

35. The method defined in claim 34 wherein said discrete particles have a mean diameter of between about 1 micron and about one-half inch.

36. A well treating composition comprising discrete solid particles of a homogeneous mixture of (1) about 4 to 30 weight percent of an ethylene-vinyl acetate copolymer containing about 17 to 19 weight percent vinyl acetate and exhibiting a melt index of about 2 to 3 grams per 10 minutes, (2) a paraffin wax having a melting point between about 160° F. and 170° F., and (3) about 10 to 25 weight percent of an oil solubility retarding agent comprising long chain aliphatic hydrocarbon and oxidized hydrocarbon waxes having melting points between about 195° F. and 250° F. and Izod strengths of less than 0.9 foot-pounds.

* * * * *